Patented Oct. 28, 1930

1,779,891

UNITED STATES PATENT OFFICE

JACQUES RISLER, OF PARIS, FRANCE, ASSIGNOR TO RISLER CORPORATION OF AMERICA, OF KANSAS CITY, MISSOURI, A CORPORATION OF DELAWARE

SKIN CREAM

No Drawing. Application filed July 15, 1927. Serial No. 206,130.

My invention relates to skin creams and more particularly to a composition of that character which will protect the skin from harmful components of light rays and promote radiation and generation of those components which are beneficial to the skin.

It is well known that fluorescent and phosphorescent substances will absorb light rays of short wave length but will readily transmit rays of longer wave length and I have found that a skin cream containing phosphorescent zinc sulfide is soothing to the skin and protective against sunburn.

It is, therefore, the principal object of my invention to produce a skin cream which will absorb light rays of short wave length, such as violet and ultra-violet rays, to protect the skin from irritation, pigmentation and other ill effects produced by the light rays of short wave length without interfering with radiation and generation of the rays of long wave length.

Generically my invention consists in the combination with a base consisting of an emulsion of oil, fat or fatty acid in an aqueous medium of a fluorescent or phosphorescent material in suspension in the base, and in prodcing the cream I prefer to use phosphorescent zinc sulfide, either natural or artificial. The artificial product is particularly desirable in that it can readily be obtained in a finely divided form and because it has qualities of intense light absorption and emission.

I have found that phosphorescent zinc sulfides which emit green, orange or red light are particularly suitable and that of these sulfides, those which emit the orange and reddish light are most desirable because they effect a greater absorption of the blue and violet rays and permit freer transmission of the beneficial orange and red rays.

I have further found that the most advantageous base for the cream may consist of:

(1) Emulsions in aqueous media containing an alkali soap of stearic acid, commonly known as vanishing creams, or (2) Emulsions of paraffine oil or vegetable oils in aqueous media known as cold creams.

In addition to the base and fluorescent or phosphorescent material I also prefer to use coloring and scenting ingredients to produce a more marketable product.

More specifically the composition or skin cream embodying my invention consists of the following ingredients in substantially the proportions named:

|  | Grams. |
|---|---|
| Pure stearic acid | 170 |
| Glycerine, 100% | 210 |
| Distilled water | 569 |
| Ammonia water, sp. g. 0.96; 10% NH$_3$ | 50 |
| Violet or lavender essence | 1 |
| Phosphorescent zinc sulfide | 100 |

In compounding the cream, the stearic acid, glycerine and distilled water are warmed on a water bath to about 35° C., and the ammonia water added. This mixture is then stirred and further warmed on the water bath to about 85° C., when it is removed and beaten until cold. The coloring and scenting ingredient is then mixed in the cream base and the phosphorescent zinc sulfide then added to the above mixture, which constitutes the cream base, and the base and sulfide mixed in a dough mixer to provide a smooth cream.

The skin cream above described may be packed in containers in accordance with common practice and applied in the same manner as are creams of the same general nature.

What I claim and desire to secure by Letters Patent is:

1. Skin cream for preventing sunburn composed of substantially 100 parts by weight of phosphorescent zinc sulfide and 1000 parts by weight of a cream base made by heating and mixing together in substantially the proportions indicated, 170 g. stearic acid, 210 g. glycerine, 569 g. distilled water and 50 g. ammonia water containing 10% by weight of $NH_3$ and adding to the mixture when cold 1 g. of violet essence.

2. Skin cream for preventing sunburn composed of phosphorescent zinc sulfide and an oil-in-water-type-emulsion base.

3. Skin cream for preventing sunburn composed of one part by weight of phosphorescent zinc sulfide and ten to one hundred parts by weight of an oil-in-water-type-emulsion base.

In testimony whereof I affix my signature.

JACQUES RISLER.